3,618,507
APPARATUS FOR THE VENTILATION OF
MOVING VEHICLES
William J. Rakocy, Clifton, N.J., assignor to Ronson
Corporation, Woodbridge, N.J.
Filed Dec. 8, 1969, Ser. No. 882,890
Int. Cl. B60h 1/24
U.S. Cl. 98—2.12                                2 Claims

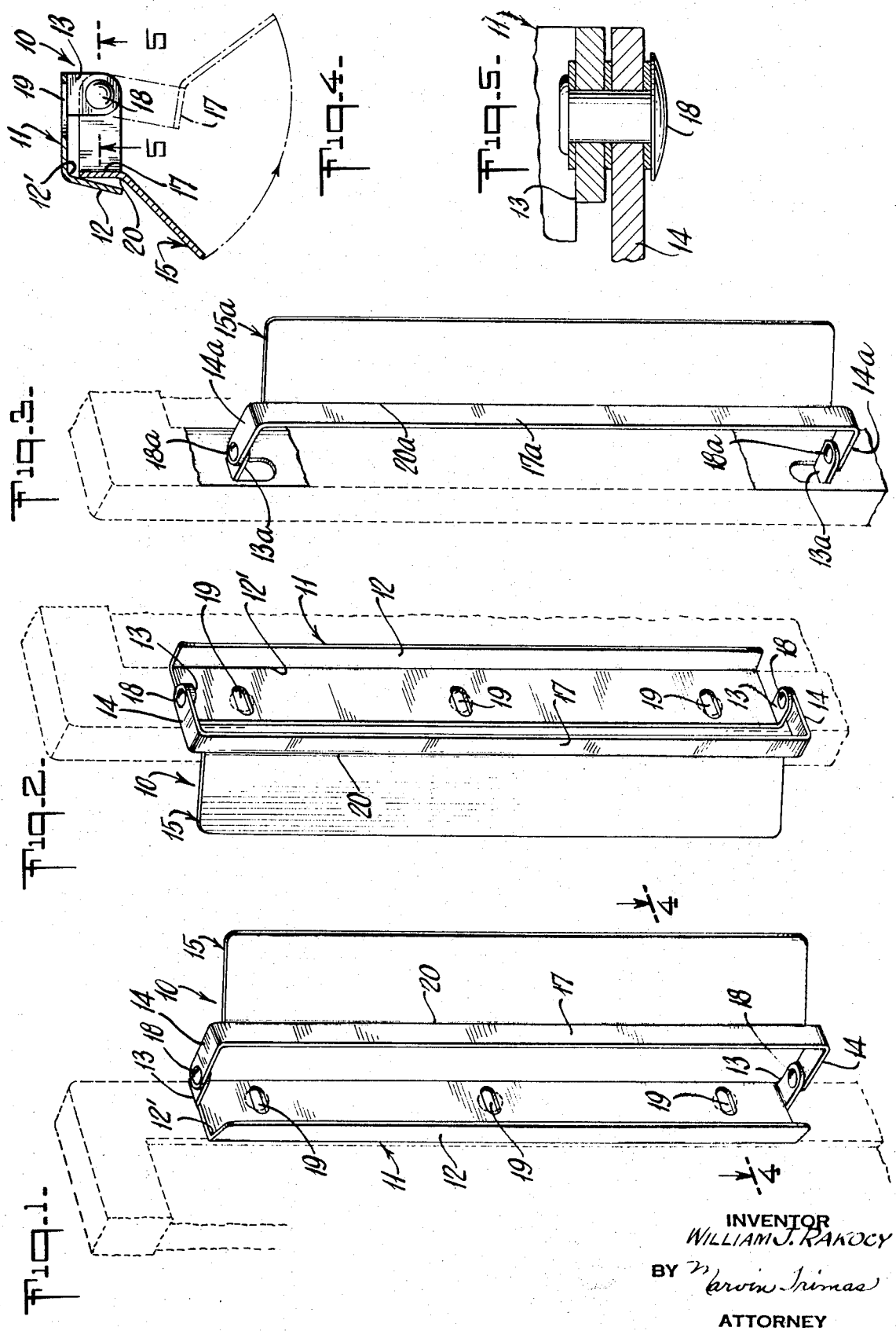

ABSTRACT OF THE DISCLOSURE

The present invention relates to a new type of apparatus to ventilate moving vehicles such as helicopters, by directing a stream of air into the confines of the vehicle. The amount and direction of this air is controlled by moving the attachment which consists of a wind direction plate and fastening means, through an infinite number of selectively variable positions.

BACKGROUND

While many moving vehicles are equipped with ventilation and/or air conditioning devices, others, such as helicopters, remain uncomfortable to both pilot and passenger, due to non-existent or inadequate oxygenation and air cooling. The cabin of a helicopter heats up rather quickly because of its necessary exposure to the sun, and because of its very small volume. To provide a small helicopter with an air-conditioning unit is not only quite costly but adds too many precious pounds to the weight of the aircraft. Similarly, to manufacture the vehicle with vents cut into its skin or frame creates aerodynamic problems and is rather expensive. The present invention avoids these problems by merely attaching a very lightweight and inexpensive attachment to one or more windows of the aircraft. The attachment will then direct a flow of air into the vehicle to refresh its occupants.

Other vehicles, such as automobiles which already possess one or a combination of cooling devices, may utilize the present invention. Instead of cutting vents into the frame of automobiles, it would be simpler and less expensive to attach this new apparatus to any or all the windows of any size or shape car. In addition, this apparatus can entirely replace the small vent window that most cars come equipped with, replacing it with a single window and the aforementioned apparatus.

SUMMARY OF THE INVENTION

The principal object of the present invention is to provide ventilation for moving vehicles where previously no provision has existed, and also to provide those with existing ventilation or air conditioning devices with an additional ventilating capacity.

Another object of the invention is to provide a ventilation device which is simple to manufacture, lightweight, inexpensive, and operates with relative ease and dependability.

The unit consists of at least one plate fastened to any or all windows of the vehicle such that it can be moved between its open and closed position. It is positioned on the window such that it will not interfere with the window setting closely in its frame, and so that it may also be used as a handle to open and close the window when it is fastened to said window on the inside.

The plate can be moved through an infinite number of selectively variable positions to obtain the amount of ventilation desired.

DESCRIPTION OF THE DRAWING

FIG. 1 is a perspective view showing the apparatus in its single plate form as it would appear if fastened to the front inner portion of a window;

FIG. 2 is a perspective view showing the apparatus with the wind direction and fastening plates attached to the inner rear part of a window, and FIG. 3 is a perspective view showing the apparatus with the wind direction and fastening plates attached to the inner rear portion of a window.

FIG. 4 is a cross sectional view taken along the line 4—4 in FIG. 1, and

FIG. 5 is a cross sectional view taken along the line 5—5 of FIG. 4.

DETAILED DESCRIPTION

Referring to FIG. 1, there is shown the entire unit 10. In this position, the unit is positioned on the inner front part of a window of a moving vehicle, such as a helicopter. It can be placed on any or all windows which are substantially parallel to the direction of motion of the vehicle.

The unit 10 is fastened to the window by means of the fastening plate 11. A plurality of holes 19 are provided which enables the plate 11 to be attached to a window. To effectuate this fastening, bolts, screws, pins or any other means of attachment will suffice. While only three holes 19 are shown positioned linearly at the forward-most portion of the plate, there is no preferred position for these holes, nor is there any need to limit them to this number.

At the rear-most portion of this plate is a handle 12. One form of construction is to bend or form the end of the plate along the line 12'. The edge of the plate as shown is bent through an angle of ninety degrees, but any convenient angle may be used. The plate 11, in this form serves to fasten the entire attachment to the window and also is a handle to open and close the window by applying a force to the handle in a direction parallel to the movement of the window.

At the forward-most part of the plate 11 directly in line with the fastening holes, are tabs 13, one each on the top and bottom. The tabs 13, project into the compartment or cab at right angles to the plate. The tabs 13, are integral with extensions of plate 11 and each has a hole in its end for the insertion of a pin 18.

The wind direction plate 15 serves to direct a flow of air into the cab, by extending out past the periphery of the window at angles approximately between 30 and 75 degrees. This plate 15 has tabs 14, on its top and bottom edges which mate with the tabs 13 of the other plate 11. The tabs 14 protrude from and can be integral with a vertical edge of said plate 15, and are formed with the same angles as the tabs 13 on plate 11, and extend radially toward the pins. The distance between the tabs 14 on the wind direction plate 15 is slightly greater, by an amount approximately equal to the thickness of the tabs 13 on plate 11, than the distance between the tabs 13. When the holes in the corresponding tabs 13 and 14 are matched, a pin 18 is driven through this opening, such that the tabs 13 and 14 are held together. The tabs 14 are slightly longer than the tabs 13, which allows the plate 15 to rotate about the pins 18 through its infinitely variable positions. The length of the tabs 14 is such that when the unit 10 is in its fully closed position, a longitudinal section 17 of plate 15 extending from the bottom tabs 14 to the top tab 14, fits relatively flush against the lip 12. This longitudinal section 17 is approximately as wide as the width of the tabs and terminates in the line 20 which runs the entire length of the plate.

The plate 15 is in the form of a fin or wing which is bent at the line 20 at an angle of less than ninety degrees to section 17. When plate 15 is turned to its open position by rotating it about the pins, such that it extends out past the periphery of the window, it directs a flow of air into the cab. This bend in the plate serves two purposes: the fin portion 15 can extend out at an acute angle approximately between 30 and 75 degrees, to the plane of the window to cause a flow of air to be directed into the cab, and the abrupt change in angle to 90 degrees, redirects the flow away from the occupants causing it to flow around them.

When the unit 10 is fully closed, the plate 15 extends slightly into the cab at an acute angle of about 40 degrees to the window, and imposes no barrier to the closing of the window in its frame.

FIG. 2 shows the same unit as in FIG. 1 as it would appear if connected to the inside rear part of the window. To connect it in this way, it is turned through an angle of approximately 180 degrees, such that the handle faces the front of the window. To place the plate 15 in a position to direct air into the cab, it is rotated clockwise instead of counterclockwise rotation when the unit is attached on the front of the window.

FIG. 3 shows another embodiment of the unit 10a as it appears in single plate form. It is identical to the units shown in FIGS. 1 and 2 except that the fastening plate 11 is omitted. In this embodiment, the window may be provided with tabs 13a to mate with the tabs 14a on the plate 15a, and pins 18a inserted in the same way as shown in FIGS. 1 and 2. Any other form of fastening the plate 15a may be used as long as the plate 15a is able to rotate about the front or rear vertical edges of the window. In this and the previous embodiments, when the plate 15a is located at either the inner front or rear of the window, and is in its fully closed position, the application of a force to the plate at a slightly acute angle to the plane of the plate, causes it to serve as a handle, which can be used for the opening and closing of the window. Once the window is open, the plate can be rotated to its operating positions.

This simply constructed apparatus is particularly useful for vehicles such as helicopters which may not have any other means of ventilation. Various changes may be made in details within the scope of the claims without departing from the spirit of the invention. It is, therefore, understood that the invention is not to be limited to the details as shown and described since it will be obvious to those skilled in the art that various changes and modifications can be made without departing from the invention. It is intended to cover all such changes and modifications as fall within the true spirit and scope of the invention in the appended claims.

What is claimed is:

1. Apparatus for the ventilation of a vehicle comprising,
    (a) a fastening plate having means thereon to facilitate the securement of the plate, and
    (b) handle means on said fastening plate to provide a surface to be grasped by a user for reciprocal movement of said plate, and
    (c) at least one tab secured to said fastening plate and extending at approximately a right angle thereto, and
    (d) a rotatable wind deflecting plate having at least one tab extending therefrom which is pivotally joined to the tab on the fastening plate by a pin, whereby the wind deflecting plate can be selectively moved to a position adjacent said handle and to a position distal with respect to said handle.

2. Apparatus for the ventilation of a vehicle as defined in claim 1 in which the wind deflecting plate is angularly disposed with respect to the fastening plate when the tab on the fastening plate and the tab on the wind deflecting plate are disposed parallel and at right angles with respect to each other.

References Cited
UNITED STATES PATENTS

| | | | |
|---|---|---|---|
| 2,610,566 | 9/1952 | Schreckengost | 98—2.2 |
| 2,797,126 | 6/1957 | Brooks | 98—2.2 X |

MEYER PERLIN, Primary Examiner

W. C. ANDERSON, Assistant Examiner